(12) United States Patent
Simmons et al.

(10) Patent No.: US 7,275,751 B2
(45) Date of Patent: Oct. 2, 2007

(54) WEAR BAR FOR SNOW MACHINE SKI

(76) Inventors: Verlin M. Simmons, 495 S. Main St., Providence, UT (US) 84332; Val J. Simmons, 720 S. 300 East, Providence, UT (US) 84332

( * ) Notice: Subject to any disclaimer, the term of this patent is extended or adjusted under 35 U.S.C. 154(b) by 20 days.

(21) Appl. No.: 10/961,622

(22) Filed: Oct. 8, 2004

(65) Prior Publication Data

US 2005/0077693 A1    Apr. 14, 2005

Related U.S. Application Data

(60) Provisional application No. 60/509,484, filed on Oct. 8, 2003.

(51) Int. Cl.
*B62B 17/00* (2006.01)
(52) U.S. Cl. .................... 280/28; 280/609
(58) Field of Classification Search ............ 280/608, 280/28, 609, 21.1, 22.1
See application file for complete search history.

(56) References Cited

U.S. PATENT DOCUMENTS

| | | | | | |
|---|---|---|---|---|---|
| 3,632,126 | A | * | 1/1972 | Shorrock | 280/28 |
| 3,732,939 | A | * | 5/1973 | Samson | 280/28 |
| 3,773,343 | A | * | 11/1973 | Ambrose | 280/28 |
| 3,856,318 | A | * | 12/1974 | Hollenbeck | 280/28 |
| 3,866,933 | A | * | 2/1975 | Mollring | 280/28 |
| 3,870,331 | A | * | 3/1975 | Cryderman | 280/28 |
| 3,877,713 | A | * | 4/1975 | Mabie et al. | 280/28 |
| 3,942,812 | A | * | 3/1976 | Kozlow | 280/28 |
| 4,077,639 | A | * | 3/1978 | Reedy | 280/28 |
| 4,784,233 | A | * | 11/1988 | Favors | 280/14.25 |
| 5,344,168 | A | * | 9/1994 | Olson et al. | 280/28 |
| 5,370,198 | A | | 12/1994 | Karpik | 180/193 |
| 5,667,031 | A | | 9/1997 | Karpik | 180/193 |
| 5,692,579 | A | | 12/1997 | Peppel et al. | 180/190 |
| 5,700,020 | A | * | 12/1997 | Noble | 280/28 |
| 5,836,594 | A | * | 11/1998 | Simmons | 280/28 |
| 5,881,834 | A | | 3/1999 | Karpik | 180/193 |
| 6,032,752 | A | | 3/2000 | Karpik et al. | 180/9.52 |
| 6,276,699 | B1 | * | 8/2001 | Simmons et al. | 280/28 |
| 6,390,219 | B1 | | 5/2002 | Vaisanen | 180/193 |
| 6,631,912 | B2 | * | 10/2003 | Metheny | 280/28 |
| 6,971,653 | B2 | * | 12/2005 | Takahiko | 280/28 |
| 6,974,139 | B2 | * | 12/2005 | Lund | 280/28 |
| 2001/0022435 | A1 | * | 9/2001 | Cormican | |
| 2002/0033290 | A1 | | 3/2002 | Vaisanen | 180/190 |
| 2003/0025392 | A1 | | 2/2003 | Morin et al. | 305/178 |
| 2006/0175777 | A1 | * | 8/2006 | Lemieux et al. | |

* cited by examiner

*Primary Examiner*—Christopher Bottorff
(74) *Attorney, Agent, or Firm*—Kunzler & McKenzie (57) ABSTRACT

A wear bar assembly is disclosed for aiding in the steering of a snow machine. The assembly may include a wear bar for attachment to a bottom of a snow machine ski and one or more hardened inserts, each insert extending outward from the bottom of the wear bar. The one or more inserts extend outward from the bottom of the wear bar with a varying height. An apparatus for use as a snow machine ski is also disclosed. The apparatus may include a base, a tip formed integrally with the base and extending longitudinally forwardly from the base, a tail formed integrally with the base and extending longitudinally rearwardly from the base, at least one keel disposed to extend downwardly from the base, and the wear bar assembly with progressively varying inserts extending downwardly from the keel.

20 Claims, 7 Drawing Sheets

FIG. 1 (Prior Art)

(Prior Art)

WEAR BAR FOR SNOW MACHINE SKI

CROSS-REFERENCES TO RELATED APPLICATIONS

This application claims benefit of U.S. Provisional Patent Application No. 60/509,484 entitled WEAR BAR FOR SNOW MACHINE SKI and filed on Oct. 8, 2003 for Verlin M. Simmons et al. which is incorporated herein by reference.

BACKGROUND OF THE INVENTION

1. Field of the Invention

This invention relates to skis used on snowmobiles and similar vehicles and more particularly relates to wear bars attached to a bottom surface of the ski for turning on ice and snow.

2. Description of the Related Arts

Technology has made it possible to travel off-road during winter, even in very remote areas. Current machines for traveling over snow, such as snowmobiles, for example, provide the ability to travel swiftly and safely in back-country locations where the terrain is quite rugged. Winter sports industries such as recreational vehicle sales and rentals and tourism are growing rapidly as a consequence of this new technology. Industry and rescue operations are also benefiting greatly.

Snow machines continue to be refined and improved. For instance, in the case of snowmobiles, improved performance and reliability allows operators to travel swiftly, safely, and comfortably into secluded regions otherwise inaccessible in winter and in some cases in summer also. Other technological advances, such as increased traction, power, and weight reduction are allowing snowmobiles to be operated in snow depths and terrain previously thought impossible.

The snowmobile is a light and agile tracked snow machine that is intended primarily for recreational operation by one or two persons. The small size, lightness, and high power output of these machines makes them highly responsive to shifts in weight and other operator inputs. Using tracks with large lugs and high powered engines, these machines can go faster over trails and deeper in rugged terrain than larger snow machines such as the dual-tracked, multiple passenger vehicles currently available. The ruggedness of snowmobiles allows operators to travel over the snow safely at speeds impossible to match by wheeled vehicles in summer and to travel directly to any desired point by "as-the-crow-flies" navigation.

Typically, a snowmobile comprises an elongated rubberized looped track of about 10 or more feet in length, of which three to six feet contact the snow. The snowmobile is driven by a two-stroke or four-stroke engine, and the power is applied to the track with the use of a centrifugal clutch. Unlike dual-tracked snow machines, the snowmobile track does not extend entirely to the front of a snowmobile. Instead, the front of the machine rests on one or two specially adapted skis, such as the ski 100 of FIG. 1. The skis are attached to the steering mechanism of the snowmobile which may be provided with suspension components to handle bumps. With the use of the handle bars, the operator is able to alter the facing of the skis. Turning the skis in a selected direction generally causes the snowmobile to follow the selected direction of travel of the skis and turn in that direction.

Conventional snowmobile skis are designed under the notion that to provide the highest degree of speed and flotation, the ski must be smooth and relatively flat. Thus, conventional snowmobile skis are typically smooth and flat. A single shallow keel is often tyically provided extending along the center of the ski to exert a lateral shear force against the snow when the ski is turned, forcing the ski to adhere to an intended direction of travel. Alternatively, a ski with dual keels such as the ski 100 of FIG. 1 has been developed to improve flotation, safety, and turning.

Figure 1:
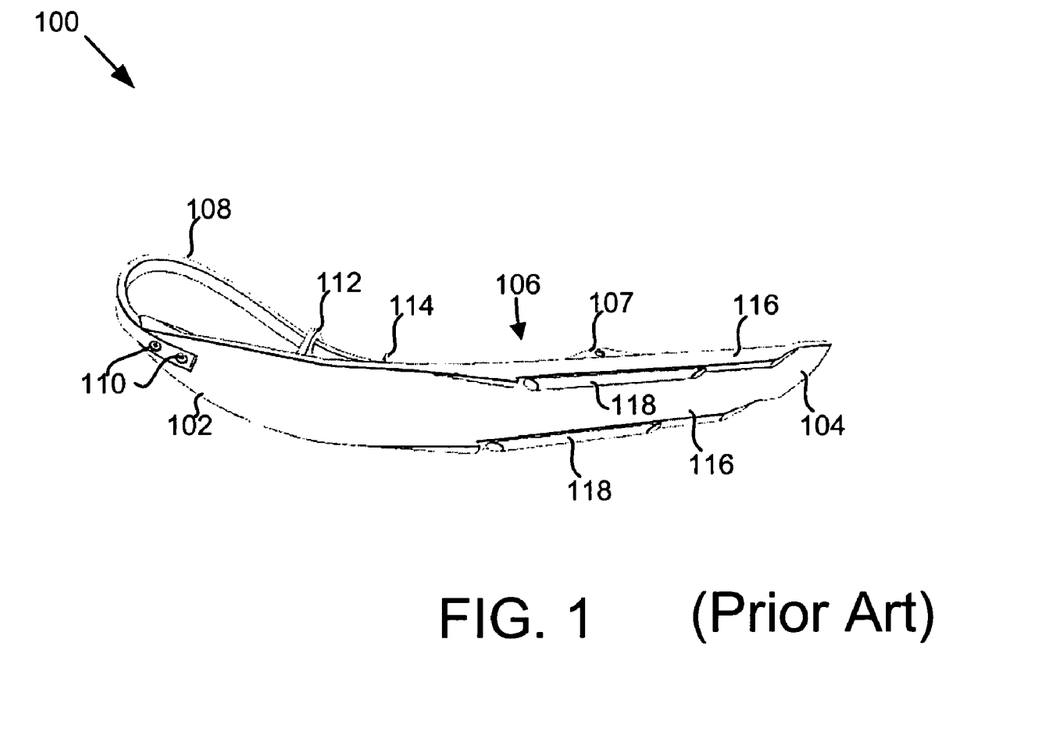
FIG. 1 is a perspective view diagram illustrating one embodiment of a snow machine ski in accordance with the prior art.

Wear bars 118 are typically placed at the bottom of the keels of the snowmobile skis, generally at the bottom of the keels as shown in FIG. 1, though not necessarily so. One or more wear bars 118 may be located on the bottom of each ski. The wear bars 118 enhance the turning ability of the ski 100, especially on hard packed snow and ice. The wear bars are also typically replaceable, allowing a low cost part to be replaced periodically when wear occurs, rather than the entire ski.

Figure 2:
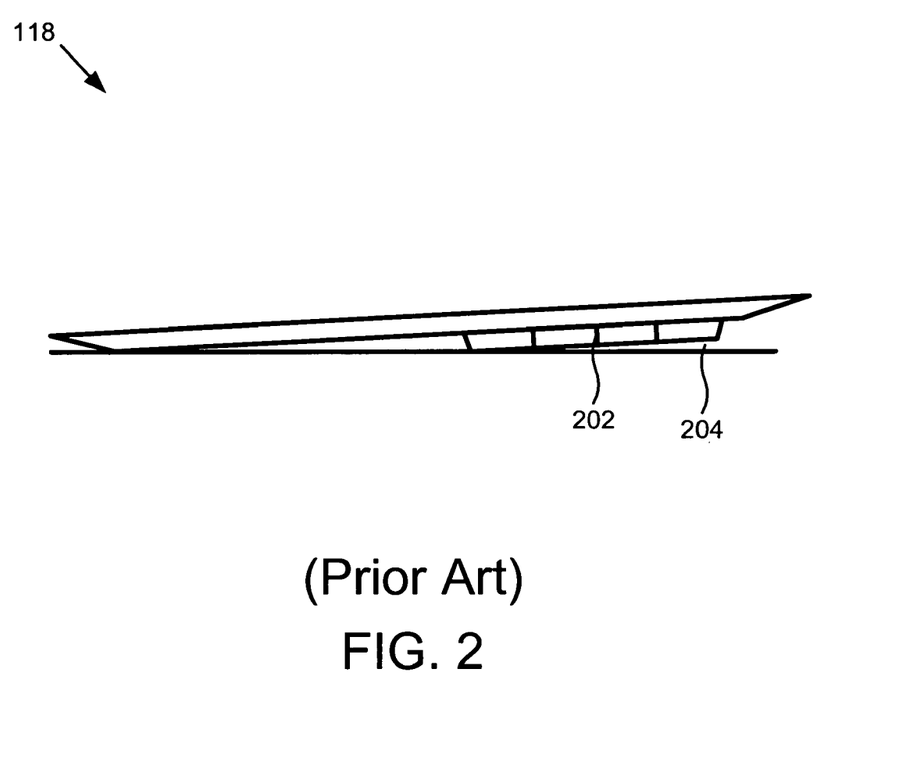
FIG. 2 is a schematic block diagram illustrating one embodiment of a wear bar in accordance with the prior art.

Even with the use of keels and wear bars, conventional snow machine skis may still experience lateral slippage on hard packed surfaces. The sliding of the conventional skis in the original direction of travel is termed "pushing." In order to overcome this behavior, hardened inserts have been coupled to the wear bars 118. The inserts, generally positioned towards the rear of the wear bar 118, provide additional shear force during a turn. In some wear bar designs, hardened inserts 202, as seen with reference to FIG. 2, are generally configured extending outward from approximately the bottom of the wear bar 118 and are disposed at the rear of the wear bar 118. Unfortunately, on hard-packed surfaces, this arrangement causes a situation wherein the wear bar 118 may not be in contact fully with a hard packed surface, as illustrated in FIG. 2. In such a situation, the ski tips to the front, causing the wear bar and consequently the hardened inserts 204 to contact the underlying surface (e.g., hardened snow or ice) at an angle. This can cause the snowmobile to track improperly on a hard-packed surface, and can cause the wear bar 118 to wear unevenly.

As technological barriers are being overcome, certain limitations of current snow machines have come glaringly to light. To fully utilize current technological benefits, snowmobiles must be provided with increased flotation ability, steering ability, and tracking capability. Until these needs are met, much terrain will remain impassible or at least dangerous to the operators of snow machines.

As a result of the above discussion, it should be readily apparent that if a ski could be used to provide high floatation in powder snow and also provide improved steering on packed and groomed surfaces, the ski would be a great improvement in the art, complementing the technological advances already made. Such a ski would provide increased winter access to rugged terrain, greater enjoyment to consumers, and greater safety for those traveling off-road in winter.

SUMMARY OF THE INVENTION

The present invention has been developed in response to the present state of the art, and in particular, in response to the problems and needs in the art that have not yet been fully solved by currently available wear bar assemblies. Accordingly, the present invention has been developed to provide a wear bar assembly that overcomes many or all of the above-discussed shortcomings in the art.

The wear bar assembly may comprise a wear bar for attachment to a bottom of a snow machine ski, one or more hardened inserts, each insert extending outward from the bottom of the wear bar, and wherein the one or more inserts extend outward from the bottom of the wear bar with a varying height. In one embodiment, each insert extends outward at an angled height having an angle in the range of between about 2 and 20 degrees. Alternatively, the angle may be in the range of between about 5 and 12 degrees.

The angled height may be formed by a first end extending outward approximately 1/64 inch and laterally increasing to a second end extending outward approximately 1 inch. In a different embodiment, the angled height is formed by a first end extending outward approximately 1/32 inch and laterally increasing to a second end extending outward approximately 1/2 inch.

In one embodiment, the inserts may extend outward with a stepped height having increasing heights in the range of between about 1/64 inch and 1 inch. In a further embodiment, the inserts extend outward with increasing heights in the range of between about 1/32 inch and 1/2 inch. The hardened inserts may be formed of a carbon metal compound. In another embodiment, a combined length of the inserts is substantially equivalent to a length of the wear bar. Alternatively, the combined length of the inserts is less than the length of the wear bar. In another embodiment, each insert has a length in the range of between about 1/4 and 12 inches.

An apparatus of the present invention is also presented. In particular, the apparatus, in one embodiment, includes a base comprising a gliding surface for moving over snow, the gliding surface extending in a longitudinal direction positionable to correspond to a desired direction of travel, and extending in a lateral direction between a first edge and a second edge. The apparatus also includes a tip formed integrally with the base and extending longitudinally forwardly from the base, and a tail formed integrally with the base and extending longitudinally rearwardly from the base.

In a further embodiment, the apparatus may include a pair of keels disposed to extend downwardly from the base proximate the first and second edges, respectively, to form a channel extending a distance selected to be effective to apply a turning force in the lateral direction effective to maneuver a snow machine over snow and ice covered terrain. The keels may have a plurality of wear bars, each wear bar configured to extend downwardly from one keel.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

The described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a perspective view diagram illustrating one embodiment of a snow machine ski 100 in accordance with the prior art. The snow machine ski (hereinafter "ski") 100 maybe functionally divided into an upturned tip 102, a tail 104, and an intervening base portion 106. The base portion 106 extends in a longitudinal direction extending from the tip 102 to the tail 104.

In one embodiment, the ski 100 may include a bracket 107 for connecting to a steering mechanism of a snow machine (not shown). In the depicted embodiment, the bracket 107 is provided for connecting to a steering spindle of a snowmobile. The ski 100 may also include a loop 108 configured to act as a bumper for protecting the front of the ski from impacts, while also providing a gripping handle for the operator. The loop 108 may be dynamically mounted at one or both ends, providing flexibility and shock absorption to the tip 102.

In a further embodiment, the loop 108 is fixedly coupled to the tip 102 of the ski 100 with bolts 110. The loop 108 bends up and back, transitioning through a first apertured sliding brace 112, and through a second apertured sliding 114. A free end of the loop 108 (not shown) is movable in a longitudinal direction with respect to the braces 112, 114 allowing the loop 108 to flex within the braces 112, 114. This arrangement allows the tip 102 to flex backwards and absorb shock normally transmitted through conventional snow machine skis.

In one embodiment, the ski 100 may comprise one or more downwardly extending keels 116. The keels 116 may extend over the length the ski 100, or alternatively, extend longitudinally along the bottom of the base portion 106. In a further embodiment, the keels 20 may not be present on the tip 102 or the tail 104. Shown attached to each keel 116 is a wear bar 118.

The wear bar 118 may comprise an elongated metal wear bar designed to make primary contact with harder surfaces, such as roadways and packed or icy snow, in order to prevent wear. The wear bar 118 is also designed to focus the weight of the snow machine on a smaller surface area, acting as runners and guides for improved steering control. As depicted in FIG. 1, the ski 100 comprises one or more wear bars 118. Of course the ski 100 may also be implemented with a centrally located wear bar 118, or with three or more wear bars 118.

FIG. 2 is a schematic block diagram graphically illustrating one embodiment of the wear bar 118 in accordance with the prior art. The wear bar 118 may comprise one or more hardened inserts 202 (hereinafter "inserts"). The inserts are preferably formed of a hardened material such as carbon metallic compound. For example, the inserts of the present invention may be formed of a compound of carbon with one or more metallic elements, as is currently found on conventional wear bars. The metallic elements may include, but are not limited to, tungsten, tantalum, titanium, and chromium.

The inserts 202 are generally configured extending outward from approximately the bottom of the wear bar 118 and are disposed at the rear of the wear bar 118. Unfortunately, on hard-packed surfaces, this arrangement causes a situation wherein the wear bar 118 may not be in contact fully with a hard packed surface, as illustrated in FIG. 2a. In such a situation, the ski tips to the front, causing the wear bar and consequently the hardened inserts 204 to contact the underlying surface (e.g., hardened snow or ice) at an angle, leaving a gap 204 where the wear bar should contact the surface of the snow or ice. This gap 204 may contribute to improper snowmobile tracking on a hard-packed surface, and additionally may cause the wear bar 118 to wear unevenly.

Figure 3:
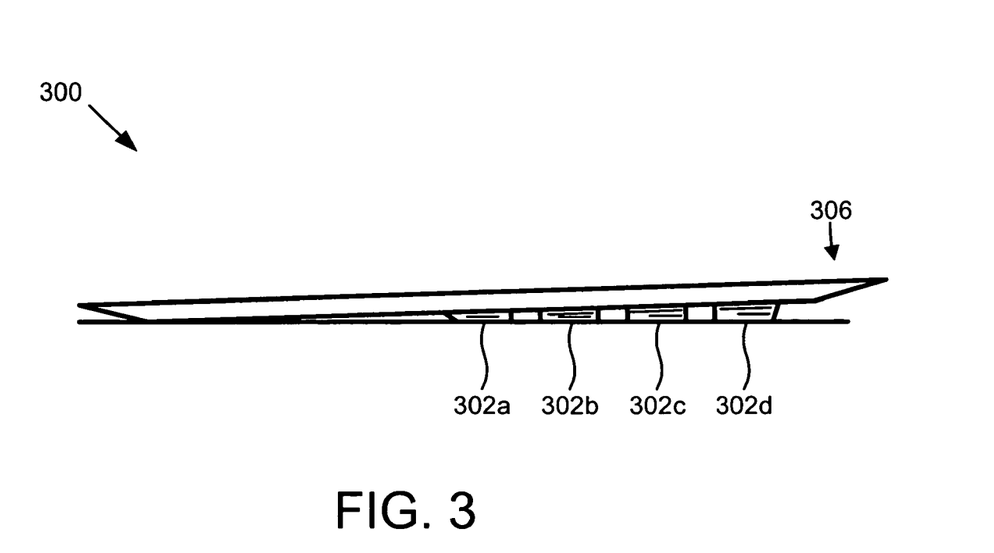
FIG. 3 is a schematic block diagram illustrating one embodiment of a wear bar in accordance with the present invention.

FIG. 3 is a schematic block diagram graphically illustrating one embodiment of a wear bar 300 in accordance with the present invention. In one embodiment, a plurality of inserts 302 are positioned toward an end 304, 306 of the wear bar 300, though the inserts 302 may be positioned at other locations on the wear bar 300. In order to overcome the problem discussed above with reference to FIG. 2, each insert 302 may be configured to extend outward from the wear bar 300 with a varying height. Each insert 302 may be individually positioned within the wear bar 300, or alternatively positioned such that the inserts 302 collectively form a continuous insert 302 surface.

For example, insert 302a which is positioned closest to a first end 304 of the wear bar 300, extends outward with a height in the range of between about 0 inch (flush with the bottom of the wear bar 300) and about $\frac{1}{8}^{th}$ inch. Subsequent inserts 302b, 302c, 302d may gradually increase in height such that the wear bar maintains full contact with a surface. In one embodiment, the maximum height of any insert is in the range of between about ¼ inch and 1 inch. In an alternative embodiment, the maximum height is approximately ½ inch.

Figure 4:
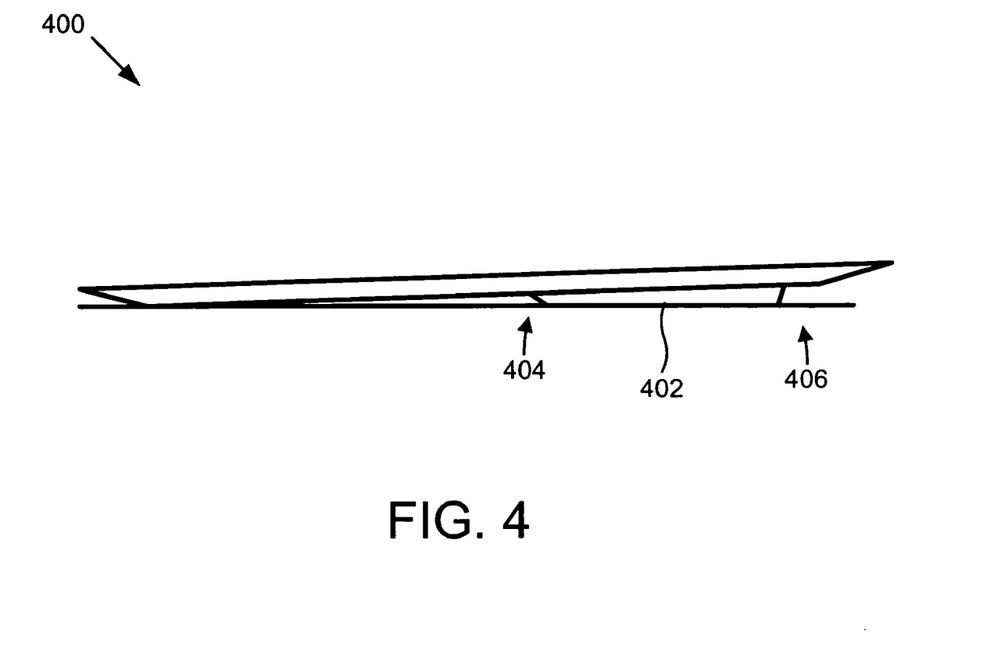
FIG. 4 is a schematic block diagram illustrating an alternative embodiment of a wear bar in accordance with the present invention.

FIG. 4 is a schematic block diagram graphically illustrating an alternative embodiment of a wear bar 400 in accordance with the present invention. In one embodiment, the wear bar 400 may comprise a single insert 402. The insert 402 may have any length less than the overall length of the wear bar 400. In a further embodiment, the insert 402 has a length in the range of between about 2 and 12 inches. Alternatively, the length of the insert 402 may be in the range of between about 4 and 7 inches.

The insert 402 extends outward from the wear bar 400 with a gradually varying, progressively increasing height. As discussed above with reference to FIG. 3, the insert 402 may extend outward at a first end 404 with a height in the range of between about 0 inch (flush with the bottom of the wear bar 400) and about $\frac{1}{8}^{th}$ inch. Alternatively, the insert 402 may extend outward as depicted, with an angled first end 404, and subsequently increasing height towards a second end 406. The height of the insert 402 at the second end 406 may be in the range of between about ¼ inch and 1 inch.

Figure 5:
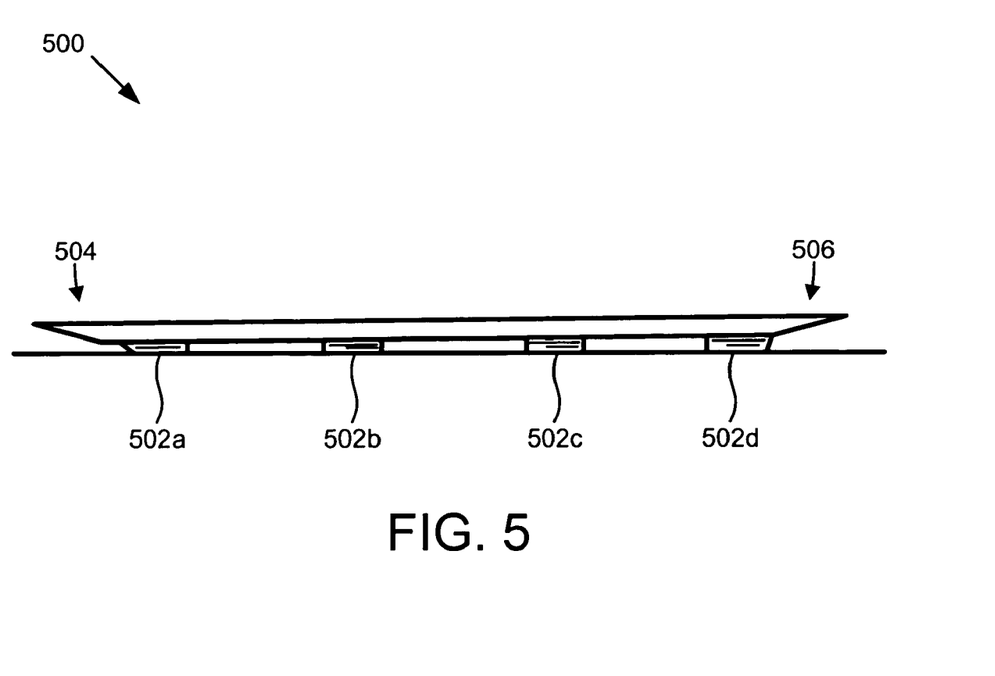
FIG. 5 is a schematic block diagram illustrating another embodiment of a wear bar in accordance with the present invention.

FIG. 5 is a schematic block diagram graphically illustrating an alternative embodiment of a wear bar 500 in accordance with the present invention. The wear bar 500 may comprise a plurality of inserts 502, each insert 502 similar in size and shape to inserts 302 of FIG. 3. In the depicted embodiment, the inserts 502 may be equally spaced across a bottom surface of the wear bar 500. The inserts 502 are configured with stepped, progressively increasing heights, the shortest height being placed closest to a first end 504, and gradually increasing the greatest height positioned closest to a second end 506.

Figure 6:
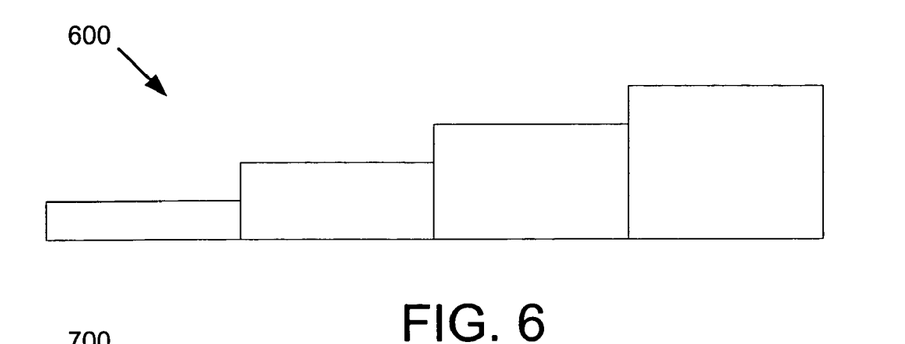
FIG. 6 is a schematic block diagram illustrating one embodiment of a wear bar insert in accordance with the present invention.
Figure 7:
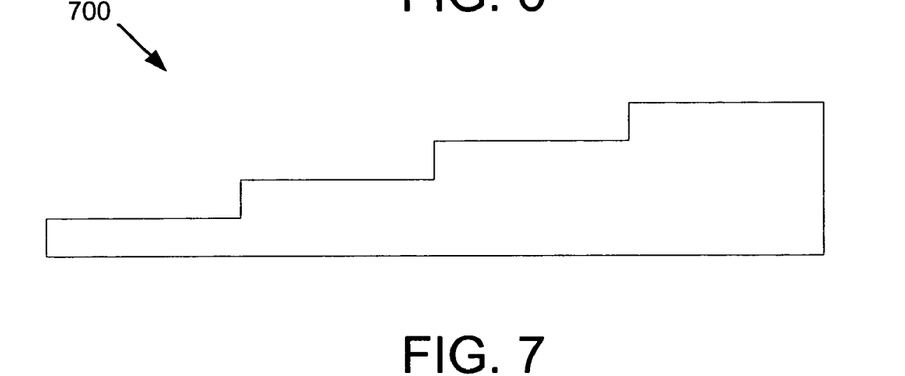
FIG. 7 is a schematic block diagram illustrating an alternative embodiment of a wear bar insert in accordance with the present invention.

FIGS. 6–9 are schematic block diagrams graphically illustrating different embodiments of inserts in accordance with the present invention. FIG. 6 illustrates an embodiment of a stepped height insert 600. The insert 600 is a collection of smaller inserts 602. Alternatively, the insert 600 may be formed as a single insert 700, as depicted with reference to FIG. 7.

Figure 8:
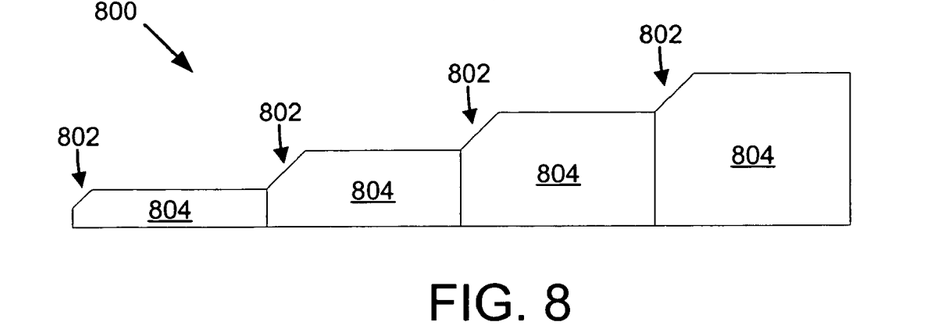
FIG. 8 is a schematic block diagram illustrating another embodiment of a wear bar insert in accordance with the present invention.

FIG. 8 illustrates an insert 800 having a stepped profile similar to the insert 600 of FIG. 6. However, the insert 800 may include angled portions 802 configured to reduce drag as the insert cuts through snow and ice covered terrain, or travels over hard surfaces such as a concrete or pavement. Likewise, the insert 800 may be formed as a single insert instead of a collection of smaller inserts 804.

Figure 9:
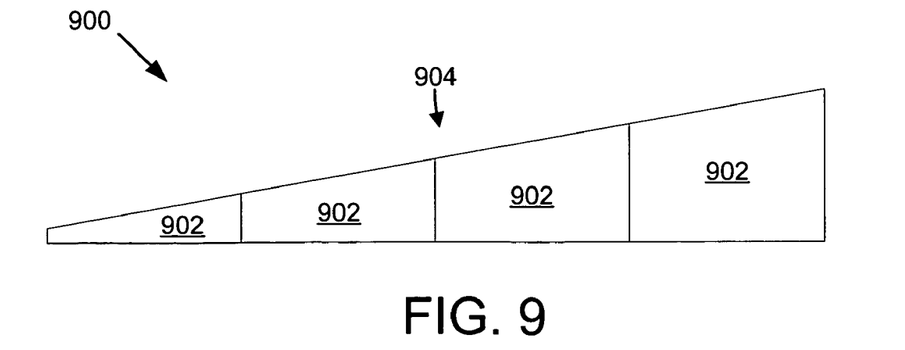
FIG. 9 is a schematic block diagram illustrating another alternative embodiment of a wear bar insert in accordance with the present invention.

FIG. 9 illustrates an alternative embodiment of an insert 900 in accordance with the present invention. The insert 900 may be formed of smaller inserts 902 configured with a continuously sloping cutting surface in place of a stepped height surface. As with FIGS. 6 and 8, the insert 900 may also be formed as a single insert.

Figure 10:
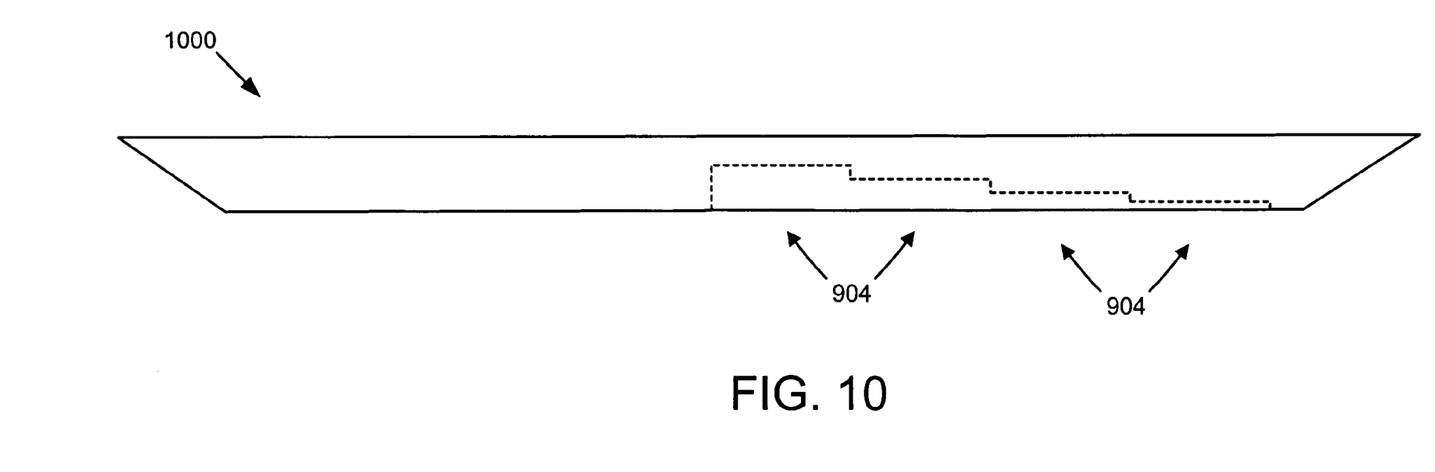
FIG. 10 is a schematic block diagram illustrating an embodiment of a wear bar in accordance with the present invention.

FIG. 10 is a schematic block diagram illustrating one embodiment of wear bar 1000 in accordance with the present invention. The wear bar 1000 may be configured with a plurality of openings 1002, each opening having a different depth. The depth of each opening 1002 is graphically represented by dashed lines. The openings 1002 are each configured to receive a hardened insert. The varying depth of the openings 1002 allow a common insert to be used to achieve varying height inserts and overcome the problem of having the gap 204 as discussed with reference to FIG. 2.

Figure 11:
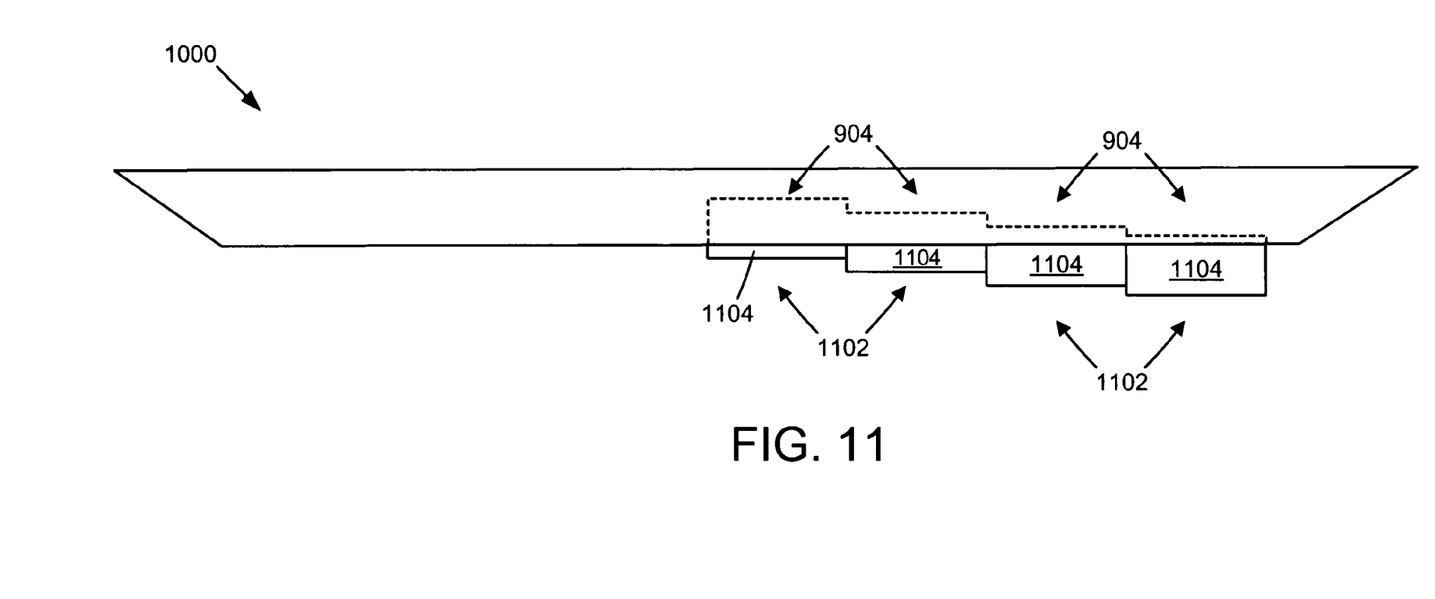
FIG. 11 is a schematic block diagram illustrating one embodiment of a wear bar having a plurality of inserts in accordance with the present invention.

FIG. 11 is a schematic block diagram illustrating the wear bar 1000 having a one insert in each opening 1002 in accordance with the present invention. As discussed above with reference to FIG. 10, a plurality of inserts 1102, each having the same height, may be placed into the openings 1002. Due to the varying depths of the openings 1002, however, the inserts 1102 will subsequently have exposed portions 1104 with varying heights extending outward from the wear bar 1000.

Figure 12:
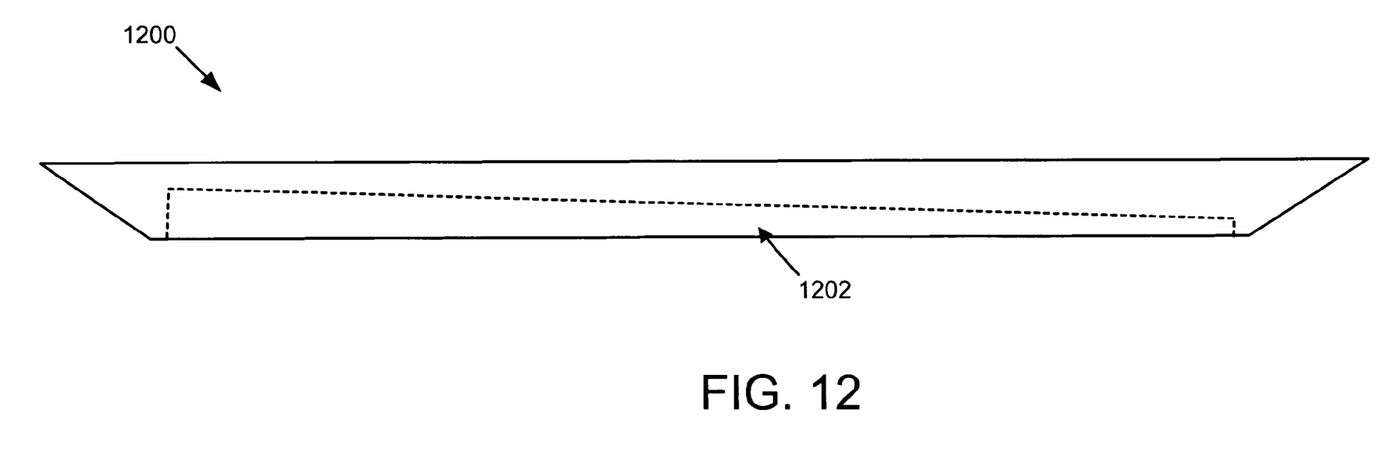
FIG. 12 is a schematic block diagram illustrating a wear bar having an opening for receiving at least one insert in accordance with the present invention.
Figure 13:
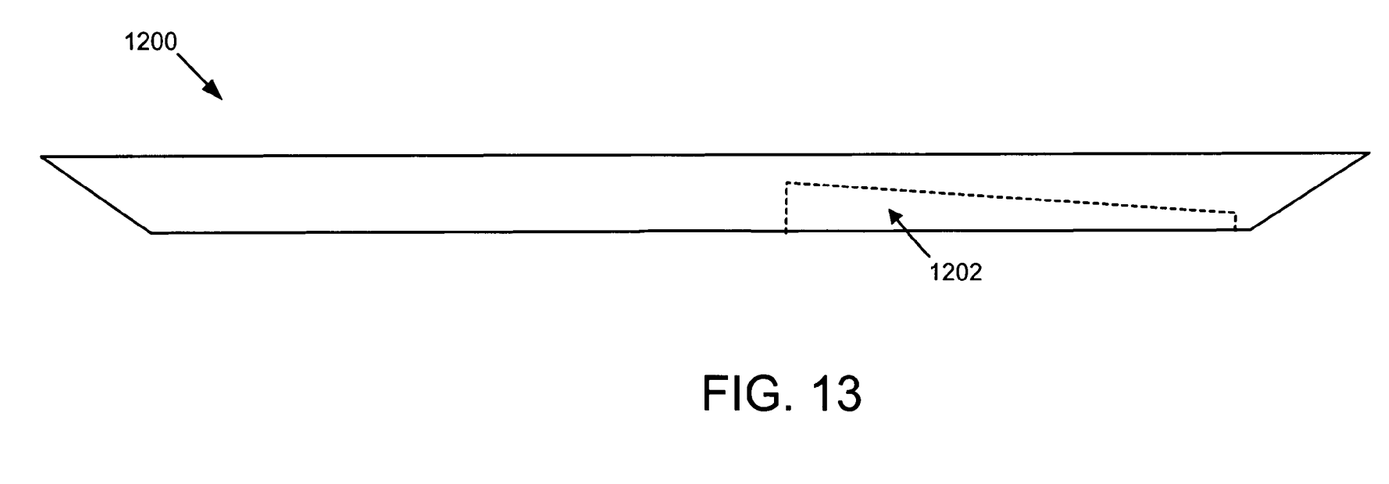
FIG. 13 is a schematic block diagram illustrating an alternative embodiment of a wear bar having an opening for receiving at least one insert in accordance with the present invention.

FIG. 12 is a schematic block diagram illustrating a wear bar 1200 having a single opening 1202 in accordance with the present invention. The single opening 1202 may be angled such that a single insert having a uniform height will result in an exposed portion that extends outward from the wear bar with a varying height. The opening 1202 may extend along substantially the entire length of the wear bar 1200. Alternatively, the opening 1202 may be considerably shorter, and may be positioned in the middle, or closer to one end of the wear bar, as in FIG. 13.

Figure 14:
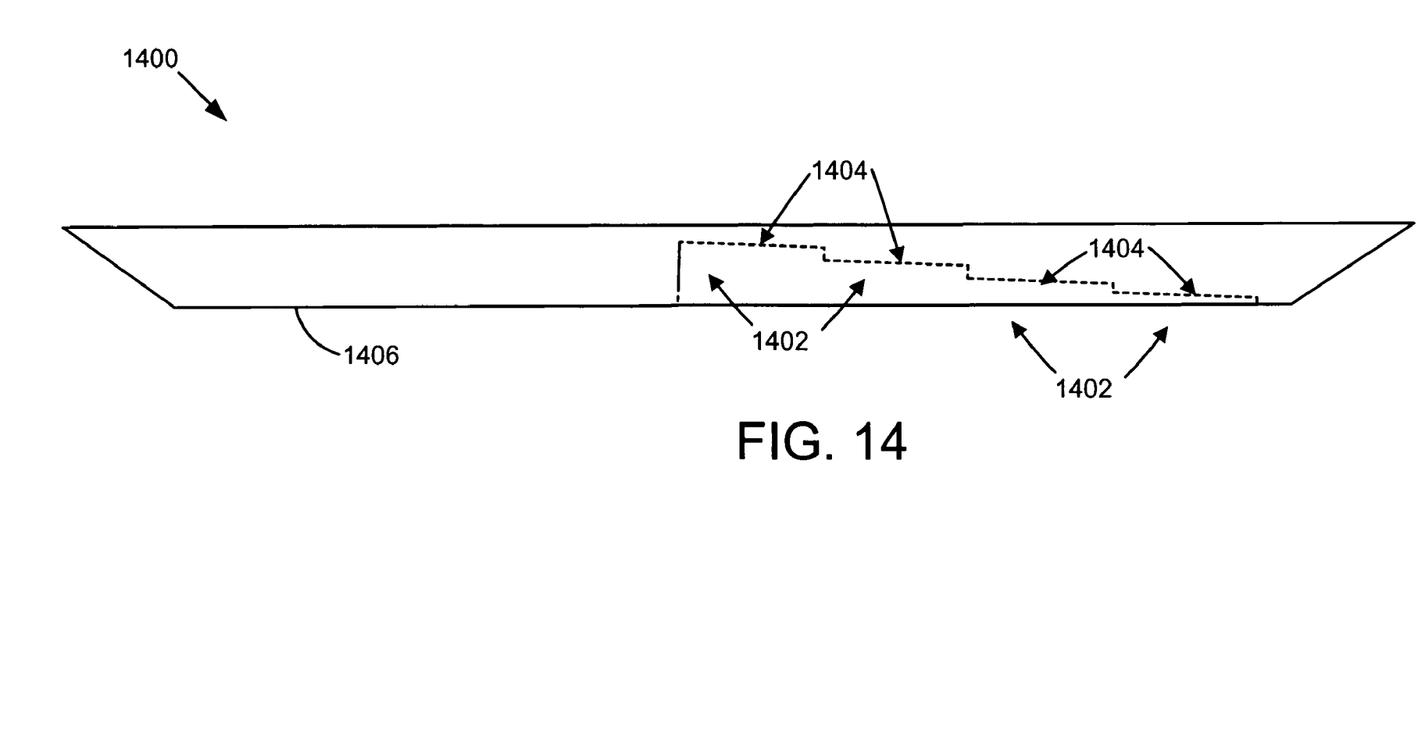
FIG. 14 is a schematic block diagram illustrating another embodiment of a wear bar having an opening for receiving at least one insert in accordance with the present invention.

FIG. 14 is a schematic block diagram illustrating one embodiment of a wear bar 1400 having a plurality of openings 1402 in accordance with the present invention. The openings 1402 may be formed in the wear bar 1400 having an angled (not parallel to a bottom surface 1406 of the wear bar 1400) base 1404. Each opening 1402 is configured to receive a standard insert, and angle the insert to have a stepped height that is not parallel to the bottom surface 1406 of the wear bar 1400.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wear bar assembly for a snow machine ski, the wear bar comprising:
   a wear bar for attachment to a bottom of a snow machine ski;
   at least one hardened insert, the at least one insert extending substantially outward from the bottom of the wear bar; and
   wherein the at least one insert extends outward from the bottom of the wear bar with a progressively varying height along substantially the entire length of the at least one insert.

2. The wear bar assembly of claim 1, wherein the at least one insert extends outward at an angled height.

3. The wear bar assembly of claim 2, wherein the angled height comprises an angle in the range of between about 1 and 20 degrees.

4. The wear bar assembly of claim 2, wherein the angled height comprises an angle in the range of between about 2 and 12 degrees.

5. The wear bar assembly of claim 2, wherein the angled height is formed by a first end extending outward approximately 1/32 inch and laterally increasing to a second end extending outward approximately 1 inch.

6. The wear bar assembly of claim 2, wherein the angled height is formed by a first end extending outward approximately 1/16 inch and laterally increasing to a second end extending outward approximately 1/2 inch.

7. The wear bar assembly of claim 1, wherein the one or more inserts extend outward with a stepped height.

8. The wear bar assembly of claim 7, wherein the one or more inserts extend outward with increasing heights in the range of between about 1/64 inch and 1 inch.

9. The wear bar assembly of claim 7, wherein the one or more inserts extend outward with increasing heights in the range of between about 1/32 inch and 1/2 inch.

10. The wear bars assembly of claim 1, wherein the at least one hardened insert is formed of a carbon metal compound.

11. The wear bar assembly of claim 1, wherein a combined length of the inserts is substantially equivalent to a length of the wear bar.

12. The wear bar assembly of claim 1, wherein the combined length of the at least one insert is less than the length of the wear bar.

13. The wear bar assembly of claim 1, wherein the at least one insert has a length in the range of between about 1/4 and 12 inches.

14. The wear bar assembly of claim 1, further comprising a second wear bar for attachment to the bottom of the snow machine ski, the second wear bar configured to improve tracking and steering of the snow machine.

15. A wear bar assembly for a snow machine ski, the wear bar comprising:
   a wear bar for attachment to a bottom of a snow machine ski;
   at least one hardened insert, the at least one insert extending substantially outward from the bottom of the wear bar; and
   wherein the at least one insert extends outward from the bottom of the wear bar with a progressively varying height along substantially the entire length of the at least one insert;

wherein each insert extends outward at an angled height, the angle in the range of between about 2 and 12 degrees;

wherein the angled height is formed by a first end extending outward approximately 1/32 inch and laterally increasing to a second end extending outward approximately 1/2 inch;

wherein the hardened insert is formed of a carbon metal compound; and wherein each insert has a length in the range of between about 3/4 inch and 1 inch.

16. An apparatus for use as a ski on a snow machine for traversing snow and ice covered terrain, the apparatus comprising:

a base comprising a gliding surface for moving over snow, the gliding surface extending in a longitudinal direction positionable to correspond to a desired direction of travel, and extending in a lateral direction between a first edge and a second edge;

a tip formed integrally with the base and extending longitudinally forwardly from the base;

a tail formed integrally with the base and extending longitudinally rearwardly from the base;

a pair of keels disposed to extend downwardly from the base proximate the first and second edges, respectively, to form a channel extending a distance selected to be effective to apply a turning force in the lateral direction effective to maneuver a snow machine over snow and ice covered terrain;

a plurality of wear bars, each wear bar configured to extend downwardly from one keel;

at least one hardened insert, the at least one insert extending substantially outward from the bottom of the wear bar; and wherein the at least one insert extends outward from the bottom of the wear bar with a progressively varying height along substantially the entire length of the at least one insert.

17. The apparatus of claim 16, wherein the at least one insert extends outward at an angled height formed by a first end extending outward approximately 1/32 inch and laterally increasing to a second end extending outward approximately 1/2 inch.

18. The apparatus of claim 16, wherein the one or more inserts extend outward with a stepped height in the range of between about 1/32 inch and 1/2 inch.

19. The apparatus of claim 16, wherein the at least one hardened insert is formed of a carbon metal compound.

20. The apparatus of claim 16, wherein the at least one insert has a length in the range of between about 1/4 and 12 inches.

* * * * *

UNITED STATES PATENT AND TRADEMARK OFFICE
CERTIFICATE OF CORRECTION

PATENT NO. : 7,275,751 B2 Page 1 of 1
APPLICATION NO. : 10/961622
DATED : October 2, 2007
INVENTOR(S) : Simmons et al.

It is certified that error appears in the above-identified patent and that said Letters Patent is hereby corrected as shown below:

Column 9, Line 13
 "ice covered teffain" should read --ice covered terrain--

Signed and Sealed this

Fourth Day of December, 2007

JON W. DUDAS
*Director of the United States Patent and Trademark Office*